United States Patent [19]
Jensen

[11] 3,911,676
[45] Oct. 14, 1975

[54] EXHAUST SYSTEM
[76] Inventor: Knud Jensen, 16, Hvidager, 2620 Albertslund, Denmark
[22] Filed: Nov. 3, 1972
[21] Appl. No.: 303,542

Related U.S. Application Data
[63] Continuation-in-part of Ser. No. 189,860, Oct. 18, 1971.

[52] U.S. Cl. ............... 60/301; 23/277 C; 23/288 F; 60/302
[51] Int. Cl.² ........................................... F01N 3/14
[58] Field of Search ............. 60/282, 301, 299, 302; 23/288 F, 277 C

[56] References Cited
UNITED STATES PATENTS

| | | | |
|---|---|---|---|
| 3,166,895 | 1/1965 | Slayter | 60/302 |
| 3,397,034 | 8/1968 | Tulleners | 60/301 |
| 3,567,403 | 3/1971 | Perga | 23/288 F |
| 3,581,490 | 6/1971 | Morris | 60/301 |
| 3,633,368 | 1/1972 | Rosenlund | 60/282 |
| 3,644,098 | 2/1972 | Palma | 60/301 |
| 3,649,215 | 3/1972 | Perga | 60/299 |
| 3,656,915 | 4/1972 | Tourlellotte | 60/301 |
| 3,740,197 | 6/1973 | Scheitlin | 60/301 |
| R25,576 | 5/1964 | Cornelius | 60/301 |

FOREIGN PATENTS OR APPLICATIONS

| | | | |
|---|---|---|---|
| 354,692 | 1931 | United Kingdom | 23/288 F |
| 1,043,890 | 9/1966 | United Kingdom | 60/302 |
| 1,292,146 | 4/1969 | Germany | 60/301 |

*Primary Examiner*—Douglas Hart

[57] ABSTRACT

Described herein is a two-stage exhaust manifold reactor adapted to lower the nitrogen oxide, hydrocarbon and carbon monoxide content of exhaust gas of internal combustion engines. The first stage comprises a catalytic reactor housing connected proximate to the engine exhaust ports and containing a catalyst bed between spaced perforate retainers such that the hot exhaust gas passes through the catalyst bed whereby nitrogen oxides are chemically reduced. Air is injected into the exhaust gas after traversing the catalyst bed. Air injection can be accomplished by one or more injection tubes having a plurality of openings in its side wall. Connected proximate to the catalytic reactor housing is a non-catalytic thermal oxidation reactor which receives the hot exhaust gas/air mixture and wherein hydrocarbon and carbon monoxide are oxidized.

36 Claims, 17 Drawing Figures

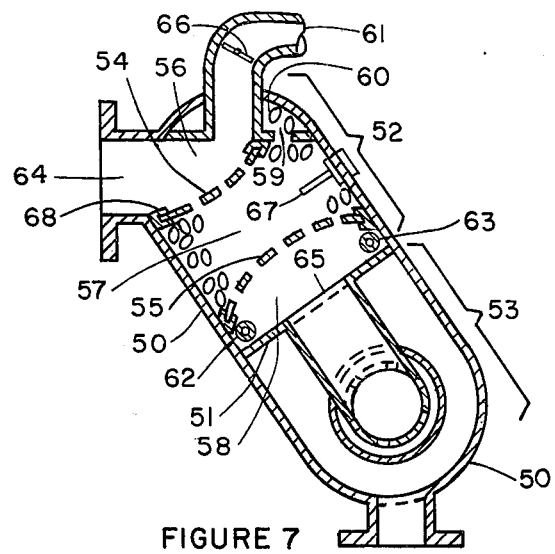

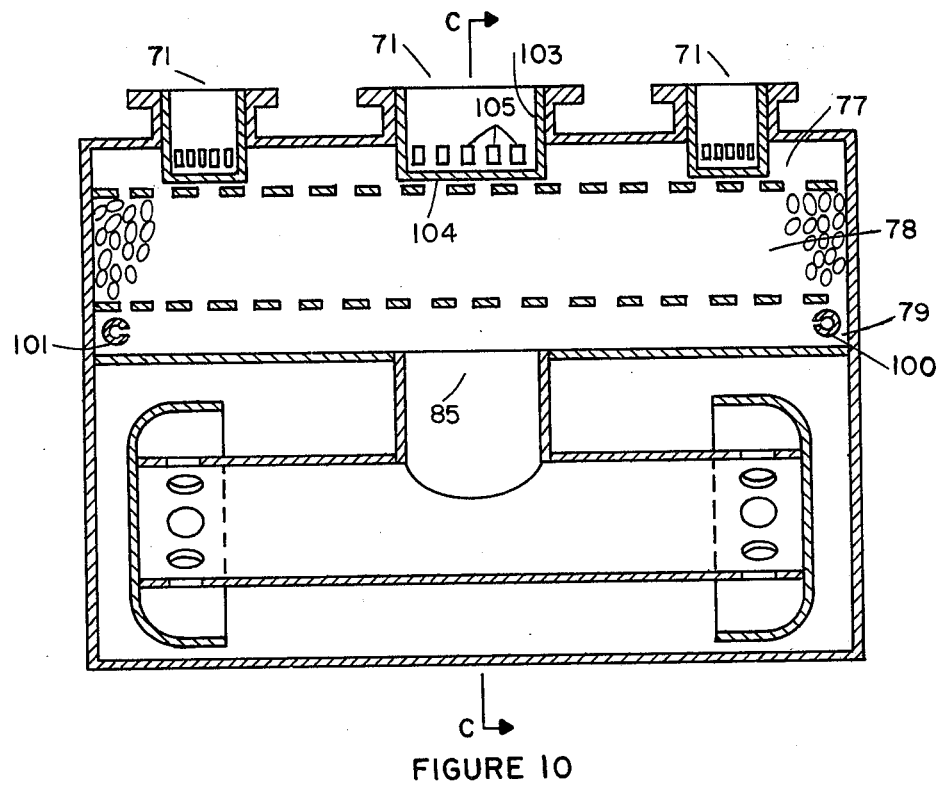
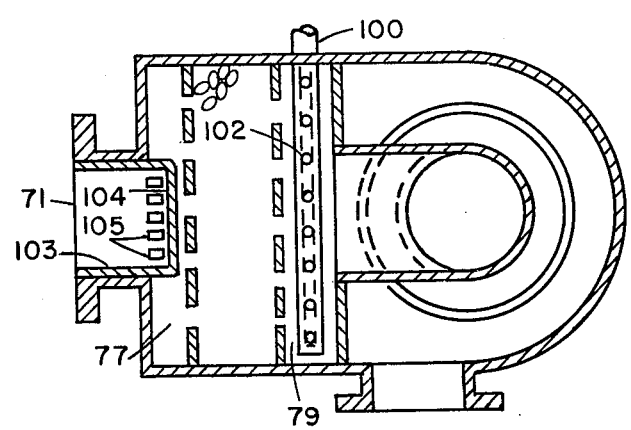

EXHAUST SYSTEM

CROSS REFERENCE TO RELATED APPLICATION

This application is a Continuation-in-Part of application Ser. No. 189,860, filed Oct. 18, 1971.

BACKGROUND OF THE INVENTION

Exhaust gas from internal combustion engines contains components which contribute to air pollution. The components most frequently referred to are nitrogen oxides, carbon monoxide and hydrocarbons. It has been found that carbon monoxide and hydrocarbons can be lowered by operating the engine at a lean air/fuel ratio (e.g., above about 14.5) and/or by oxidizing the exhaust gas mixed with air using either a catalytic reactor, a thermal reactor, or afterburner. Unfortunately, such an oxidation system does not lower the nitrogen oxide content of the exhaust gas. Lowering of nitrogen oxide can be accomplished by operating the engine at a rich air/fuel ratio and contacting the exhaust gas with a reducing catalyst.

SUMMARY OF THE INVENTION

An object of the invention is to provide a method and an apparatus to carry it into effect which, in addition to removal of carbon monoxide and unburned hydrocarbons, also removes lead, lead compounds, soot and nitrogen oxide. Furthermore, lead poisoning of the catalyst is avoided and the catalyst is not exposed to critical temperatures.

The method is characterized in the mechanical separation of lead, lead compounds and soot and reduction of nitrogen oxides by the carbon monoxide content in the exhaust gas in a catalytic reactor, whereupon, after the gas has been made oxidizing by the addition of air, carbon monoxide and unburned hydrocarbons are oxidized into carbon dioxide and water in a non-catalytic reactor.

The invention further relates to an apparatus to carry the method according to the invention into effect. This apparatus is characterized in comprising a catalytic reactor arranged to remove nitrogen oxides by reduction with carbon monoxide contained in the exhaust gas in connection with the mechanical removal of lead, lead compounds and soot and a subsequent non-catalytic reactor which is arranged to oxidize carbon monoxide and unburned hydrocarbons into carbon dioxide and water.

According to the present invention nitrogen oxides, hydrocarbon and carbon monoxide content of exhaust gas is lowered employing a unit which attaches either directly to or proximate to an internal combustion engine. This includes both reciprocating and rotary internal combustion engines. The unit can serve to replace the conventional exhaust manifold. When not connected directly to the engine ports the unit is located very close—generally less than one meter—to minimize heat loss from the initial exhaust gas. Short insulated conduits are provided to assure minimum heat loss. By having the unit connected directly to the engine exhaust ports or connected proximate to the exhaust ports through insulated conduits the exhaust gas entering the inlet to the catalytic stage of the unit under normal operating conditions is at a temperature high enough such that the exhaust gas after passing through the catalytic stage will spontaneously undergo oxidation in the subsequent thermal stage on addition of air.

By normal operation conditions is meant that the engine and unit have reached stabilized operating temperatures. Under these conditions, the exhaust gas entering the catalytic stage is at least about 800°F. Some temperature increase occurs on traversing the catalyst bed such that the exhaust gas leaving the catalytic stage is at a temperature high enough such that auto ignition occurs on addition of sufficient air to render the exhaust gas oxidizing. For such auto ignition, the exhaust gas entering the thermal oxidation stage is preferably at least 1000°F., and more preferably about 1200°F.

The unit comprises two stages. In the first stage, the exhaust gas immediately after leaving the engine exhaust port and without adding air except during start-up is passed through a catalyst bed wherein nitrogen oxides are chemically reduced by the reducing components in the exhaust. Immediately following this, air is injected into the exhaust gas to make it oxidizing (i.e., oxygen is in stoichiometric excess over oxidizable material). Air injection can be accomplished by a number of means. The preferred means is through a conduit extending into a plenum space immediately following the catalyst. This conduit has a series of openings in its side wall which result in substantially uniform exhaust gas/air mixtures throughout the plenum. This results in a substantial increase in the effectiveness of the subsequent oxidation stage.

The exhaust gas/air mixture is conducted into a second stage positioned proximate the first stage. This provides a very hot exhaust gas/air mixture to the second stage (e.g., over 1000°F. and preferably over 1200°F.) and enables it to accomplish oxidation of the mixture without injecting fuel or using an ignition device such as a spark plug, as used in some previous systems in which the oxidation stage is remote from the engine. Due to the high temperature, oxidation initiates spontaneously following air injection and progresses to a high degree of completion while the exhaust gas passes through the second stage housing. The treated exhaust gas leaves the second stage through an exhaust outlet connected to a standard engine exhaust system with or without a standard muffler. Optionally, baffles may be included in the second stage housing to increase turbulence and ensure adequate residence time. On start-up of a cold engine, air can also be injected at the engine exhaust port for a few minutes causing the first stage to operate as a catalytic oxidizer of hydrocarbon and carbon monoxide. This is a very exothermic reaction and serves to rapidly bring the unit to operating temperature. Air injection at the exhaust port is then stopped and the catalytic stage continues operation under reducing conditions to remove nitrogen oxides.

From the performance curve for a gasoline engine in FIG. 1 it appears that a strongly reducing exhaust gas is obtained with a low air/fuel ratio, causing a high CO- and HC-content and a low $O_2$-content in the exhaust gas. The present method and apparatus combination makes it possible to let the engine work with a low air/fuel ratio which in turn makes it possible for the engine to work between maximum effect and maximum efficiency, as the non-catalytic reactor is able to resist the comparatively high temperatures in the subsequent combustion of CO and HC in contradistinction to known oxidation catalysts requiring a higher air/fuel ratio and consequently a lower concentration of CO and HC to obtain lower temperatures during the combustion of CO and HC. The strongly reducing exhaust gas reduces lead compound-catalyst-complexes to innoxious metallic lead, whereby the catalyst is not poisoned by lead. The non-catalytic reactor cannot be poisoned by lead as it does not contain a catalyst.

Besides removal of NO, HC and CO, lead compounds are removed by the apparatus combination. These are reduced to free lead in the strongly reducing exhaust gas. The catalyst may contain up to 40 percent of reduced lead, which is sufficient for purifying the exhaust gas of lead during the lifetime of the car.

At the high temperatures the lead compounds in exhaust gas effect a strong corrosion of steel. Adsorption of lead in the catalytic reactor according to the invention avoids this high-temperature corrosion in the non-catalytic reactor.

In the catalytic reactor the reaction between NO and CO will cause a comparatively small increase of temperature in the exhaust gas. From FIG. 1 it appears that with a low air/fuel ratio there will be some $O_2$ left in the exhaust gas. This $O_2$ will react with CO forming $CO_2$ over the catalyst and effect a further increase of temperature of the exhaust gas of about 100°C. This increase of temperature is very important for the attainment of a sufficient temperature of the exhaust gas so that the ignition point of CO and HC at low loadings of the engine is exceeded after addition of the air required for the further combustion of CO and HC prior to the non-catalytic reactor. Furthermore, the $O_2$ concentration in the catalytic reactor will be comparatively great shortly after the start of the engine, and in this very short period of time strong combustion of CO and HC over the catalyst will take place, causing a quick heating of the apparatus. This very strongly increases the efficiency of the apparatus, without making extremely heavy demands on the thermal stability of the catalyst, as the processes are accompanied by a comparatively small increase of temperature, contrary to the secondary combustion process, which is accompanied by a great increase of temperature.

By the present invention, a relatively high reaction velocity for the conversion of NO is obtained due to the strongly reducing conditions in the catalytic reactor.

The combination of the catalytic reactor followed by the non-catalytic reactor according to the invention provides an unusually fine sound absorption.

It has been found that the embodiment of a container with porous material, which allows a number of different passages having different lengths, equalizes pressure waves and thereby effects a better operation of the injection of air and the non-catalytic reactor. The catalytic reactor thus functions as a buffer for the non-catalytic reactor and consequently causes a less pulsating flow therein.

In other words, placing the catalyst bed ahead of the air injection serves to equalize fluctuating exhaust flow caused by sequential injection of exhaust gas through a plurality of different exhaust ports. This permits uniform mixing of exhaust gas with injected air. The catalytic reactor thus functions as a buffer for the non-catalytic reactor which converts the initial pulsating exhaust flow to a constant flow.

Another important feature of the invention is that having the catalyst bed proximate to the engine exhaust outlet results in catalyst temperatures which are continuously high enough to prevent the formation of ammonia. At lower temperatures, ammonia can form by the reaction of nitrogen or nitrogen oxides with hydrogen—for example, hydrogen formed from carbon monoxide and water by the water shift reaction. Formation of ammonia in the catalyst stage results in regeneration of nitrogen oxides in any subsequent oxidation stage, thus lessening the overall nitrogen oxide removal efficiency. Previous systems such as that described in U.S. Pat. No. 3,581,490, in which the catalytic reactor is not proximate to the engine exhaust outlet, do not consistently have a sufficiently high temperature in the catalyst bed to prevent reaction of nitrogen or nitrogen oxides with hydrogen to form ammonia and thus allow regeneration of a portion of the converted nitrogen oxide in a subsequent oxidation stage.

Another result of having the catalyst reactor proximate to the engine whereby catalytic temperatures are consistently above about 1200°F. is that at these temperatures sulfur in the fuel used to operate the engine does not cause poisoning of the catalyst. The reason for this is not fully understood, but it is believed to be due to conversion of $SO_3$ to $SO_2$ at the higher temperatures. The $SO_2$ does not damage the catalyst whereas $SO_3$, present at lower temperatures, has a deactivating effect on catalysts.

Moreover, the non-catalytic reactor according to the invention may suitably be designed as a three-way tube comprising two branch tubes and a central tube, the sizes of the branch tubes and the central tube being adapted to a flow ratio of 1:1, said three-way tube opening into an internal cylinder, from where the exhaust gas flows through an external cylinder to an outlet tube.

A minimum decrease of the temperature of the exhaust gas from the exhaust port of the engine to the non-catalytic reactor is very important in order to obtain a sufficient temperature of the gas quickly after the start of the engine so that the ignition point of CO and HC is exceeded. This is obtained by arranging the apparatus on the engine instead of the normal exhaust manifold in such a way that the distance from the exhaust port to the non-catalytic reactor is as short as possible.

A minimum drop of pressure over the apparatus is important to obtain the maximum efficiency of the engine. This is obtained when the exhaust gas from the engine has a minimum velocity through the reactors.

It is believed that the combustion in the non-catalytic reactor takes place in a flame within the holes in the internal cylinder. In order to keep said flame as constant as possible it is necessary that the exhaust gas from each exhaust port has the same mixing volume for mixing with air. This is obtained when the amount of exhaust air passing the central tube to the non-catalytic reactor is twice as large as the amount passing the branch tube. The exhaust air passing through the central tube is evenly split into two halves in the internal cylinder so that all exhaust air obtains the same mixing volume for mixing with the air.

From the foregoing, it can be seen that the present invention broadly comprises a method of purifying exhaust gases from internal combustion engines characterized in that in connection with a mechanical separation of lead, lead compounds and soot, nitrogen oxides are removed in a catalytic reactor by reduction with the carbon monoxide contained in the exhaust gases, whereupon, after the gas has been made oxidizing by the addition of air, carbon monoxide and unburned hydrocarbons are oxidized to form carbon dioxide and water in a non-catalytic reactor.

In a further embodiment, it comprises an apparatus to carry the foregoing method into effect characterized in that it comprises a catalytic reactor arranged to remove nitrogen oxides by reduction with the carbon monoxide contained in the exhaust gases in connection with a mechanical separation of lead, lead compounds and soot and a subsequent non-catalytic reactor which is arranged to oxidize carbon monoxide and unburned hydrocarbons to form carbon dioxide and water.

In another embodiment, the foregoing apparatus is further characterized in that the non-catalytic reactor is designed as a three-way tube, comprising two branch tubes and a central tube, the sizes of the branch tubes and the central tube being adapted to a flow ratio of 1:1, said three-way tube opening into an internal cylinder from where the exhaust gases flow through an external cylinder to an outlet tube.

DESCRIPTION OF THE DRAWINGS

FIG. 7 is a transverse cross-section of a further embodiment in which the two stages are off-set to reduce space requirement.

FIG. 8 is a longitudinal cross-section of another embodiment of the invention.

FIG. 9 is a transverse cross-section taken at B—B in FIG. 8.

FIG. 10 is a longitudinal cross-section similar to FIG. 5 except including exhaust baffles and transverse air injection tubes.

FIG. 11 is a transverse cross-section of the FIG. 10 embodiment taken at C—C.

DESCRIPTION OF THE PREFERRED EMBODIMENTS

Figure 2:
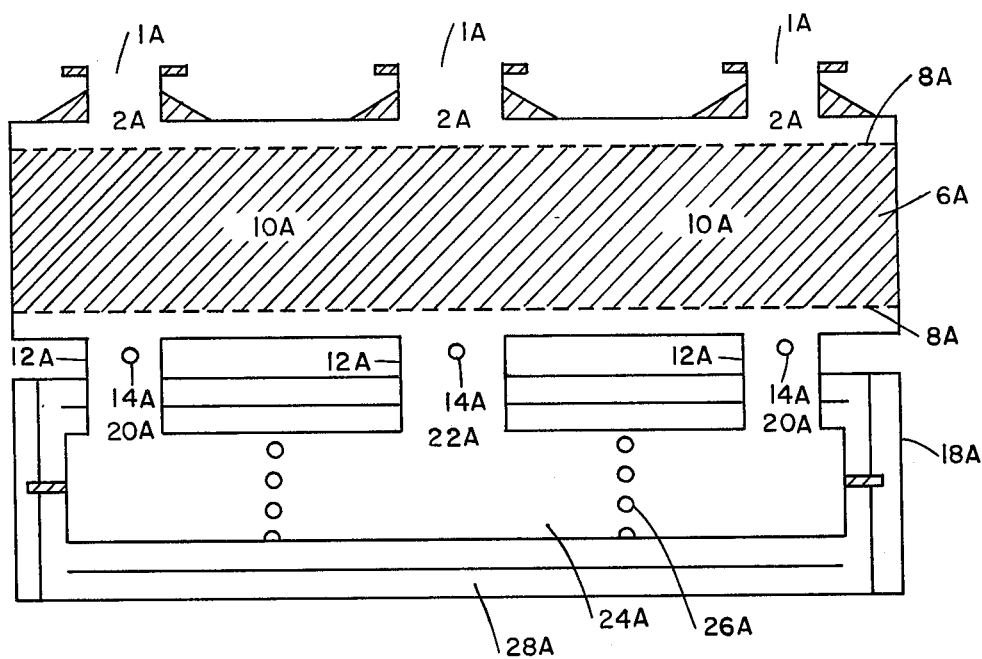
FIG. 2 shows schematically a longitudinal section of the apparatus.
Figure 3:
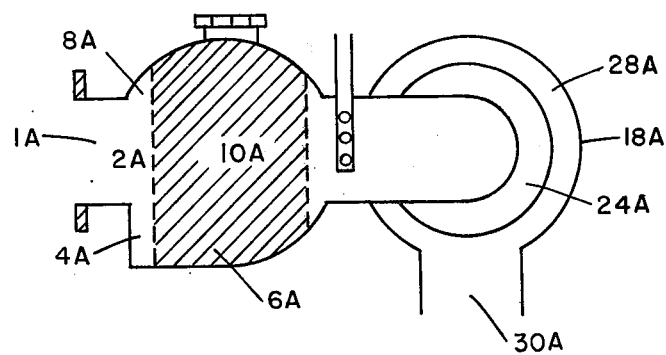
FIG. 3 shows a cross-section of the FIG. 2 embodiment.

In the following, the invention will be explained in more detail. Reference is first made to FIG. 2 and FIG. 3 which show schematically one embodiment of an apparatus to carry the invention into effect.

The exhaust gases are passed through an exhaust pipe 1A to a mechanical separator 2A. In the mechanical separator some of the lead, lead compounds, and soot present in the exhaust gases are removed therefrom. The mechanical separator is provided with a reservoir 4A for the collection of the substances separated.

From the mechanical separator the exhaust gases are passed to a catalytic reactor 6A, which is designed as a tube, wherein a catalyst 10A is contained between two wire nettings 8A.

In the reactor 6A nitrogen oxides are reduced by the carbon monoxide contained in the exhaust gases to nitrogen. As catalysts, copper-chromite or copper-silica may be used. The following table shows examples of the efficiency of the catalysts:

| Catalyst | Composition (percent) | | | Temp. °C. | Conversion of $NO_x$ (percent) |
| --- | --- | --- | --- | --- | --- |
| | CuO | $Cr_2O_3$ | $SiO_2$ | | |
| Copper-chromite[1] | 82 | 17 | 0 | 500 | above 90 |
| Copper-silica[2] | 30 | 0 | 70 | 300 | about 98 |

[1] R.A. Baker and R.C. Doerr, Process and Development, 4, No. 1, p. 188–191 (1965)
[2] S. Sourirajan and J.L. Blumenthal, Int. J. Air Wat Poll, 5, No. 1, p. 24–33 (1961)

The catalyst will not be poisoned by the quantity of lead or lead compounds present in the exhaust gases, as the reducing gas converts the many different lead compound-catalyst-complexes into one or several forms of lead, perhaps metallic lead, which show a substantially reduced deactivating effect on the catalyst.

The mechanical separator may also be placed after the catalytic reactor 6A, if desired. However, in the catalytic reactor a positive heat effect is obtained, which is desirable for the last stage of the process. It is possible that this heat effect can reduce the efficiency of the mechanical separator, when same is placed after the catalytic reactor.

From the catalytic reactor 6A the exhaust gases are passed through an air-injection tube 12A, where the exhaust gases are mixed with air drawn through a pipe 14A, whereby an oxidizing gas mixture is obtained. As air-injection tube use can be made of a tube narrowing, where part of the pressure energy of the exhaust gases is transformed into kinetic energy, resulting in a sub-pressure, and a tube widening, where some kinetic energy is recovered as pressure energy. The air-injection can also be made with an air compressor.

After mixing with air, the oxidizing gas mixture is passed to a reactor 18A which does not contain catalyst.

The reactor 18A is designed as a three-way tube with two lateral tubes 20A and a central tube 22A, each of the diameters of the lateral tubes being about 75 percent of the diameter of the central tube, so that an equal distribution of flow in the reactor is obtained. The three-way tube opens into an internal cylinder 24A, where the gas mixture is deflected and from there, through passages 26A, flows through an external cylinder 28A to an outlet pipe 30A.

In the reactor 18A a thermal combustion of carbon monoxide and unburned hydrocarbons into carbon dixoide and water takes place. Contrary to the reduction reaction for nitrogen oxide, the combustion reactions are accompanied by a substantial heat effect, whereby temperatures up to 1100°C. are obtained.

The conversion of carbon monoxide and unburned hydrocarbons into carbon dioxide and water is about 90 percent.

With a view to protecting the reactor 18A against temperatures exceeding 1100°C., the reactor may be provided with a by-pass, through which the exhaust gases can be passed at temperatures above 1100°C. The by-pass can be opened by a thermal expansion of a rod system.

The exhaust gases from the reactor 18A may have temperatures up to 1100°C. In order to lower this high temperature to about 500°C., a cooling system may be used. The outlet pipe 30A may be provided with a ring of holes, immediately followed by a conical screen which forms an angle of 45° with the outlet pipe. At the propulsion of a car the kinetic energy of the cold air flowing past is transformed into pressure energy in front of said screen with the result that the cold air flows through the holes and is mixed with the exhaust gases, whereby a cooling to a temperature of approximately 500°C. is obtained.

Figure 4:
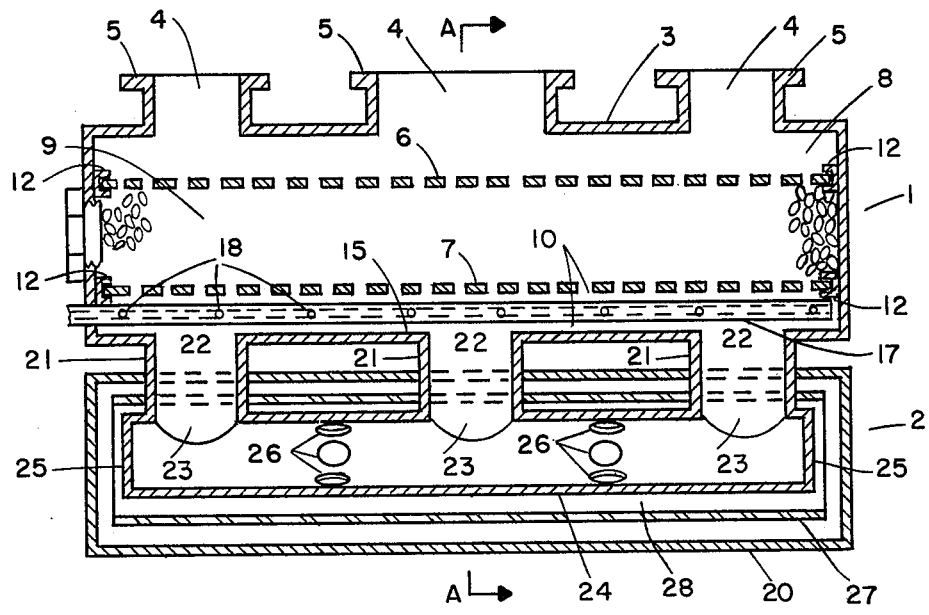
FIG. 4 is a longitudinal cross-section of the two-stage exhaust reactor of this invention showing both stages.
Figure 5:
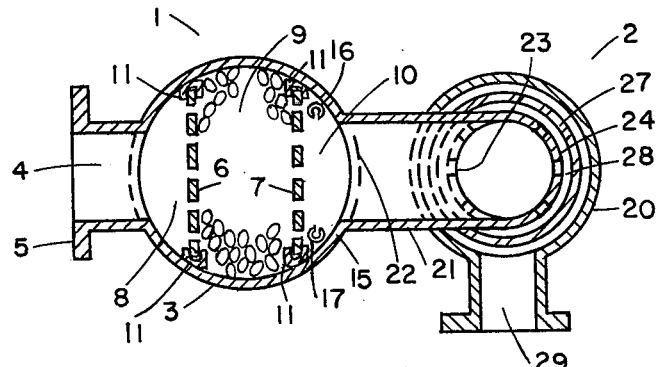
FIG. 5 is a transverse cross-section of the two-stage reactor taken at A—A in FIG. 4.

Referring to FIGS. 4 and 5, the two-stage exhaust reactor is shown in more detail and comprises a catalytic reactor indicated generally by 1, and a thermal reactor indicated generally by 2. The catalytic reactor comprises an elongated catalytic reactor housing 3 formed by a side wall and end closures. Catalytic reactor housing 3 has an exhaust inlet 4 in its side wall with flanges 5 adapted to bolt directly to an internal combustion engine and engage the exhaust ports thereof.

Longitudinally positioned within catalytic reactor housing 3 are perforate catalyst retainers 6 and 7 in spaced relationship. Retainers 6 and 7 are held in position by longitudinal channel members 11 attached to the side wall of housing 3 and channel members 12 attached to the end closure of housing 4. Retainers 6 and 7 are slidably fit into the U-slot in channel members 11 and 12. Retainers 6 and 7 divide the space within housing 3 into (a) an inlet plenum 8 located between the exhaust inlet 4 and the first of the catalyst retainers 6, (b) a catalyst chamber 9 located between retainers 6 and 7, and (c) an outlet plenum 10, located between second catalyst retainer 7 and a portion 15 of the side wall of catalyst housing 3 that lies substantially opposite exhaust inlet 4.

Air injection conduits 16 and 17 extend longitudinally through outlet plenum 10. Conduits 16 and 17 have a plurality of orifices 18 in their wall which serve to inject air substantially uniformly throughout the length of outlet plenum 10. Typically, conduits 16 and 17 have about 5 to 20 orifices about 1-5 mm diameter along their length. The far ends of conduits 16 and 17 are closed. Conduits 16 and 17 are preferably sized to ensure substantially uniform air distribution throughout outlet plenum 10, although this is not required to obtain improved results.

Thermal reactor 2 comprises a thermal reactor housing 20 located adjacent catalytic reactor housing 3. Thermal reactor housing 20 is in fluid communication with outlet plenum 10 through conduits 21 connected to opening 22 in the side wall of outlet plenum 10. Three conduits 21 are shown in FIG. 4, but the only requirement is that there be at least one. Conduits 21 should be as short as practical to prevent cooling of the exhaust gas. Preferably, the thermal reactor should be close enough to the engine such that the temperature of the exhaust gas entering the thermal reactor housing during normal operating conditions is at least 1000°F., and more preferably at least 1200°F. In previous systems such as described in U.S. Pat. No. 3,581,490, the exhaust gas was conducted to a remote location at which air was injected. In this previous work it was necessary to provide ignition means such as a spark plug, and generally necessary to inject fuel into the reactor to start the oxidation reaction because the temperature of the exhaust gas drops on being conducted to a remote location. In the present embodiment, air is injected into the exhaust gas immediately after leaving the catalyst bed and thus there is no opportunity for the exhaust gas to cool. This results in spontaneous ignition without adding fuel or providing an ignition source.

In the embodiment shown in FIGS. 4 and 5, conduit 21 connects with opening 23 in centrally located, substantially cylindrical housing 24 within thermal reactor housing 20. Central housing 24 is closed at both ends by end closures 25. Located in the side wall of central housing 24 are a number of openings 26 through which gas entering central housing 24 can escape.

Concentric baffle 27 open at both ends surrounds central housing 24 forming annular space 28. Exhaust outlet 29 is located in thermal reactor housing 20, and is adapted to connect to an exhaust pipe of a standard engine exhaust system, with or without a standard muffler. As shown, outlet 29 is located in the middle of housing 20 but it can be located at any position in housing 20.

In operation, exhaust gas enters exhaust inlets 4 and is distributed through inlet plenum 8. It passes through first perforate retainer 6 and contacts the catalyst held between retainers 6 and 7.

A wide range of catalysts capable of catalyzing the chemical reduction of nitrogen oxides in a reducing or stoichometric exhaust gas may be employed. As mentioned previously, the engine is generally operated rich such that the exhaust gas is reducing. Suitable catalysts include copper chromite, silica supported copper, copper oxide and vanadia supported on a carrier containing silica-alumina; for example, (a) 7 weight percent copper oxide, 5.7 weight percent vanadia on a carrier analyzing 13% alumina and 87% silica, (b) 7 weight percent copper oxide and 6 weight percent vanadia on a carrier analyzing 1% silica and 99% alumina, and (c) mixture of (a) and (b) such as 10-90% (a) and 90-10% (b).

Another type of catalyst is those supported on a monolithic carrier such as a honey-combed structure, aluminum silicate (mullite), or similar honey-combed structure aluminum magnesium silicates. The monolithic structure is generally given a precoat of alumina and then impregnated with the active catalytic material. Suitable active catalytic materials include copper, copper oxide, vanadia, copper oxide-vanadia, cooper oxide-vanadia-palladium, nickel oxide, and the like.

Other useful catalysts include alumina containing 1-20 weight percent zinc oxide, barium oxide, copper oxide, chromium oxide, nickel oxide, or mixtures thereof.

The preferred catalysts are:
1. 5-10% (preferably 7%) copper oxide and 5-10% (preferably 6%) vanadia on supports consisting essentially of a mixture of support (a) silica-alumina consisting essentially of 70-90% silica and 30-10% alumina, and support (b) alumina containing about 1-20% silica 2. 21–72% $Cr_2O_3$, 5–18% NiO, 28–46% CuO, 0.2–9% BaO, 1–20% ZnO and 10–45% alumina
3. A honeycomb-structured monolithic alumina-silica having the empirical composition $3Al_2O_3 \cdot 2SiO_2$ (e.g., "mullite") coated with gamma alumina impregnated with a catalytic metal such as copper oxide, vanadia, nickel oxide, chromia, copper oxide-vanadia, copper oxide-vanadia-palladium, and the like.

The above catalysts (1) and (2) can optionally contain up to 1%, preferably from 0.005 to 0.5%, palladium to lower initiation temperature which improves conversion during the first few minutes of engine operation when the catalytic reactor operates as an oxidation stage due to air injection at the engine exhaust ports. These preferred catalysts include:

4. 5–10% copper oxide, 5–10% vanadia and up to 1% palladium on supports consisting essentially of a mixture of (a) silica-alumina consisting essentially of 70–90% silica and 30–10% alumina and (b) an alumina containing 1–20% silica
5. 21–72% $Cr_2O_3$, 5–18% NiO, 28–46% CuO, 0.2–9% BaO, 1–20% ZnO and up to 1% palladium on an alumina support Of the above, the preferred catalyst is that consisting essentially of a mixture of 10–90 weight percent of (a) 5–10 weight percent copper oxide and 5–10 weight percent vanadia on a silica-alumina support consisting essentially of about 70–90 weight percent silica and 30–10 weight percent alumina, and about 90–10 weight percent of (b) 5–10 weight percent copper oxide and 5–10 weight percent vanadia on an alumina support consisting essentially of alumina containing about 1–20 weight percent silica. Neither of the components of the mixture is satisfactory alone. When operating using gasoline containing tetraethyllead, the high silica supported catalyst forms a glaze believed to be lead silicate, and when using the low silica-alumina the catalyst suffers excessive attrition. Suprisingly, mixtures of the two do not form a glaze and are attrition resistant.

The catalyst can be made according to standard procedures. For example, the supports can be impregnated separately or a mixture of two supports can be impregnated together using an aqueous solution of a water-soluble copper and vanadium salt which is thermally decomposable to an oxide. The preparation of the catalyst is illustrated by the following example.

EXAMPLE 1

Prepare an aqueous solution by adding ammonium metavanadate to warm water and then add sufficient oxalic acid to cause the vanadium salt to go into solution. Immerse a 50/50 mixture of activated silica-alumina (87 percent silica, 13 percent alumina) and alumina (1 percent silica) in the solution. Dry the vanadia-impregnated support and heat slowly to 600°C.

Prepare an aqueous solution of copper nitrate and immerse the vanadium-containing catalyst in this solution. Dry the resultant catalyst and heat to 600°C. over a 4 hour period.

The amount of vanadium and copper in the catalyst can be varied by varying their concentration in the impregnating solution or by using multiple impregnation steps.

Suitable catalysts are also described in U.S. Pat. No. 3,674,423; British Pat. No. 1,262,318; Japanese Pat. No. 72/12326; U.S. Pat. No. 3,663,457; U.S. Pat. No. 3,669,906; U.S. Pat. No. 3,661,806; French Pat. No. 2,073,862; British Pat. No. 1,262,076; Netherlands Pat. No. 71/11169; Netherlands Pat. No. 69/19472; British Pat. No. 890,410; U.S. Pat. No. 3,642,659 and U.S. Pat. No. 3,565,574.

In the catalyst bed, the nitrogen oxides of the exhaust gas are chemically reduced by the reducing ingredients in the exhaust such as hydrogen, carbon monoxide and hydrocarbons. Preferably, the engine is operated rich (air/fuel ratio below about 15) to ensure sufficient carbon monoxide to provide a reducing atmosphere in the raw exhaust.

After traversing the catalyst bed, the treated exhaust gas passes through second perforate retainer 7 and enters outlet plenum 10. At this stage, air is injected through conduits 16 and 17 which are connected to an external air source such as a belt-driven air pump mounted on the engine. Air pressure of about 3–10 psig is adequate. The air enters outlet plenum 10 through a series of orifices 18 along conduits 16 and 17. Substantially uniform air distribution can be obtained in this manner enabling more efficient oxidation of carbon monoxide and hydrocarbon in the subsequent stage. Tests will be described later which demonstrate the substantial improvement resulting from the use of a long injection conduit in the outlet plenum compared to single injection in individual outlets 21.

After mixing with air in plenum 10, the exhaust gas passes through opening 22 and conduit 21 into central housing 24 at opening 23. Because of the very high temperature of the exhaust gas leaving the catalyst bed, an oxidation reaction initiates spontaneously on adding air. Because of this, materials of construction must be able to withstand very high temperatures in excess of 1500°F. and up to, e.g., 2000°F.

Oxidizing exhaust gas leaves the initial reaction zone within central housing 24 through openings 26 entering annular space 28 and encountering cylindrical baffle 27. It then leaves annular space 28 at the open ends of cylindrical baffle 27 and subsequently exits thermal reactor housing 20 at exhaust outlet 29.

Figure 1:
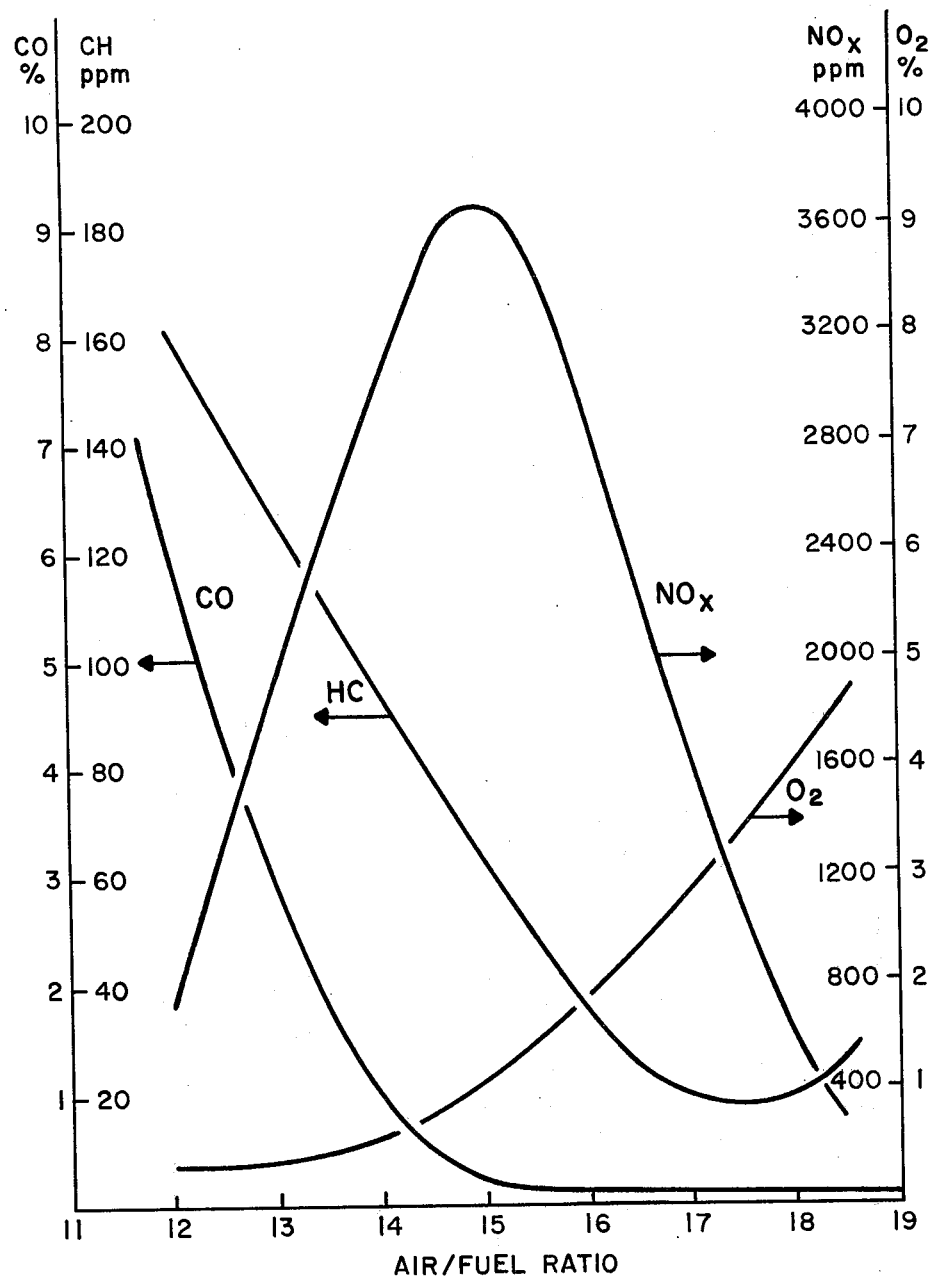
FIG. 1 shows a performance curve for a gasoline fueled engine.
Figure 6:
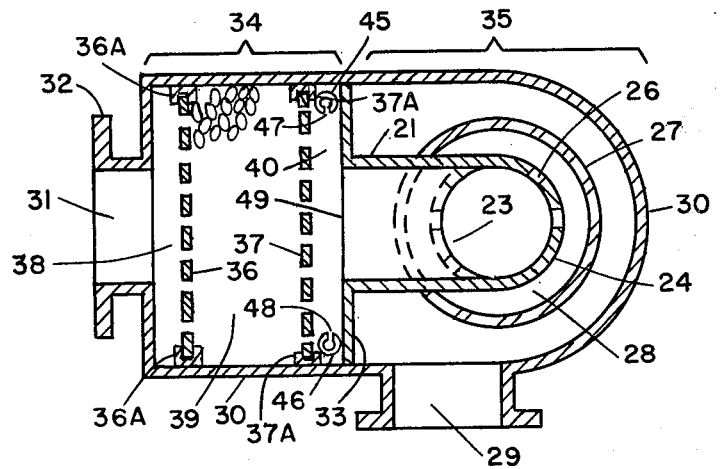
FIG. 6 is a transverse cross-section of a two-stage reactor contained in a common housing.

FIG. 6 shows in cross-section an embodiment in which both stages are enclosed in a single housing which ensures minimal heat loss between stages and decreases heat capacity of the total system. It is substantially a cross-section of the FIG. 1 embodiment with modification. It is constructed of an elongated reactor housing 30, having an exhaust inlet 31 in its side wall adapted by flange 32 to connect directly to an exhaust port of an internal combustion engine. Located within housing 30 is longitudinal partition member 33, dividing the space within housing 30 into a catalytic reactor compartment 34 and a thermal reactor compartment 35. Catalytic reactor compartment 34 has longitudinally positioned spaced perforate catalyst retainers 36 and 37 dividing the space within compartment 34 into an inlet plenum 38, between exhaust inlet 31 and first retainer 36, a catalyst chamber 39, between retainers 36 and 37, and an outlet plenum 40, between second retainer 37 and partition 33. Retainers 36 and 37 are held in position by channel members 36A and 37A which are attached to the longitudinal side wall of housing 30 within compartment 34.

Air injection conduits 45 and 46 extend longitudinally through outlet plenum 40 and have a plurality of orifices 47 and 48 along their length the same as in conduits 16 and 17 in FIG. 5. Outlet plenum 40 is connected to thermal reactor compartment 35 through opening 49 in partition 33. The interior of thermal reactor compartment 35 is constructed in the same manner as second stage 2 of the FIGS. 4 and 5 embodiment. It contains a central longitudinal, substantially cylindrical inner housing 24 formed by a side wall and end closures at both ends. Central housing 24 connects with outlet plenum 40 through conduit 21 connected with opening 49. Conduit 21 sealably engages partition 33 such that exhaust gas must pass through conduit 21 to reach the interior of central housing 24. As shown in FIG. 4, central housing 24 has openings 26 in its side wall forming a passage to annular space 28 formed by concentric baffle 27. Baffle 27 is open at both ends permitting exhaust to exit reactor compartment 35 at exhaust outlet 29 which is adapted to connect to an engine exhaust system.

The FIG. 6 embodiment operates in the same manner as that of FIGS. 4 and 5. Exhaust gas from the engine exhaust port enters catalytic compartment 34 at exhaust inlet 31 and passes through the catalyst contained in catalyst chamber 39 whereby nitrogen oxides are chemically reduced. It then enters outlet plenum 40 where air is injected into it through the series of orifices 47 and 48 in conduits 45 and 46, causing oxidation to spontaneously initiate. The hot exhaust gas/air mixture passes through conduit 21 to central housing 24 and then through openings 26 to annular space 28, and finally exits thermal reactor 35 at exhaust outlet 29.

The FIG. 7 embodiment differs from the previous embodiments in several respects. The unit is offset so that it can more readily fit into an engine compartment of an automobile. The catalyst retainer members are curved inwardly toward each other to prevent buckling of the retainers due to thermal stress. The catalyst chamber is connected with a catalyst reservoir which acts to replace catalyst lost by attrition. A by-pass is also provided as a safeguard against overheating.

Housing 50 is divided by longitudinal partition 51 into catalytic reactor compartment 52 and thermal reactor compartment 53. Longitudinal perforate catalyst retainers 54 and 55 divide catalytic reactor compartment 52 into inlet plenum 56, catalyst chamber 57 and outlet plenum 58. Inlet plenum 56 has an exhaust inlet 64 which is adapted to connect with the exhaust port of an internal combustion engine.

Retainers 54 and 55 are curved inwardly in a transverse plane toward each other. By this is meant that retainers 54 and 55 are straight longitudinally but transversely are curved inwardly. The straight longitudinal edges are slidably fit into the U-shaped slot in channel members 68 attached longitudinally to the inner surface of housing 50 within compartment 52. This serves to prevent stress build-up due to unequal expansion and contraction during heat-up and cool-down. This is the preferred method of stiffening the catalyst retainers, but the retainer members can optionally be curved outwards or one can be curved outwards and one inwards.

Catalyst chamber 57 is connected through opening 59 with catalyst reservoir 60. By-pass conduit 61 connects inlet plenum 56 with the engine exhaust system downstream from the exhaust reactor. Valve 66 is provided in by-pass 61 which is activated by temperature sensing means 67 in catalyst chamber 57 which is set to open the by-pass when the temperature in the catalyst bed exceeds a predetermined level which the catalyst and the materials of construction can withstand. The entire by-pass conduit is not shown. It can connect with the standard exhaust system downstream from the thermal reactor.

Air injection conduits 62 and 63 extend longitudinally through outlet plenum 58 and have a series of small orifices in their side wall adapted to inject air substantially uniformly throughout outlet plenum 58. Outlet plenum 58 connects through opening 65 in partition 51 with thermal reactor compartment 53. The construction of thermal reactor compartment 53 is the same as in the previous embodiments and need not be described in detail.

In operation, exhaust gas leaving the engine exhaust port passes through exhaust inlet 64 to inlet plenum 56 and then through retainer 54 to catalyst chamber 57, wherein it contacts a reducing catalyst. Any attrition of catalyst is replaced by additional catalyst dropping from catalyst reservoir 60 through opening 59.

If the temperature in catalyst chamber 57 rises above a predetermined safe limit, temperature sensor 67 placed therein causes valve 66 to open in by-pass 61 forming a passage to the exhaust system downstream from the reactor.

Exhaust gas leaving the catalyst bed through retainer 55 enters outlet plenum 58. At this stage, air is injected through injection conduits 62 and 63 in an amount sufficient to render the exhaust gas oxidizing, but not so much that the gas is diluted and cooled such that oxidation does not initiate spontaneously.

The exhaust air mixture leaves outlet plenum 58 through opening 65, entering thermal reactor compartment 53 which functions in the same manner as in the previously-described embodiment.

FIGS. 8 and 9 show an embodiment which differs in the construction of the thermal oxidation stage. It comprises a reactor housing 70, having exhaust inlets 71 along one side adapted to connect to the exhaust ports of an internal combustion engine. Longitudinal partition member 72 divides the space between the reactor housing into a catalytic reactor compartment 73 and thermal reactor compartment 74. Longitudinally positioned inside the catalytic reactor compartment 73 are spaced perforate retainers 75 and 76 which divide compartment 73 into inlet plenum 77, catalyst chamber 78, and outlet plenum 79. Baffle insert 95 is inserted in the central exhaust inlet and protrudes into inlet plenum 77. Openings 96 are provided around the circumference of insert 95 in the portion protruding within inlet plenum 77.

Air injection conduits 80 and 81 extend longitudinally through outlet plenum 79. Conduits 80 and 81 have a series of small openings 82 along their side wall. Outlet plenum 79 connects through opening 85 and short conduit 86 to a central longitudinal substantially cylindrical housing 87 located within thermal reactor compartment 74. Central housing 87 is closed at both ends by bowl-shaped deflectors 88 and 89. Openings 90 are provided in the side wall of central housing 87 proximate to both ends and within the confines of the open ends of bowl-shaped deflectors 88 and 89. An exhaust outlet 91 from thermal reactor 74 through housing 70 is provided which is adapted to connect to an automobile exhaust system.

In operation, exhaust gas enters inlet plenum 77 through exhaust inlets 71. Exhaust entering the central exhaust inlet is deflected by baffle insert 95 through opening 96. The exhaust gas then passes through retainer 75. As it traverses the catalyst bed, the nitrogen oxide content is chemically reduced to nitrogen by the carbon monoxide and hydrocarbon present in the exhaust gas. The exhaust gas then enters outlet plenum 79 through retainer 76. Air is injected substantially uniformly throughout the length of plenum 79 by injection conduits 80 and 81, through a series of small orifices 82 in their side wall. Oxidation initiates spontaneously without providing an external ignition source due to the extremely high temperature. The oxidizing gas leaves outlet plenum 79 through opening 85 and conduit 86 entering central housing 87. It is then forced through openings 90 and deflected inwardly by bowl-shaped deflectors 88 and 89 into thermal reactor chamber 97. The oxidized gas then exits thermal reactor chamber 97 through exhaust outlet 91.

FIGS. 10 and 11 show an embodiment similar to that in FIGS. 8 and 9 which differs in the construction of the air injection conduits. It comprises air injection conduits 100 and 101 at both ends of outlet plenum 79 extending transverse into outlet plenum 79. Conduits 100 and 101 have a series of small opening 102 along their side wall.

Baffle 104 is installed in inlet plenum 77 next to exhaust inlets 71. It is constructed in the form of a hollow cylindrical insert 103 press-fit through exhaust inlets 71 and having a bottom closure 104 which functions as the baffle. Openings 105 are provided around the circumference of insert 103 protruding within inlet plenum 77.

In operation, exhaust gas entering inlet 71 impinges against baffle 104 and enters inlet plenum 77 through openings 105. This serves to prevent the direct blast of the hot exhaust gas against the catalyst bed which prolongs the life of the catalyst and retainer and prevents channeling of the exhaust gas through narrow zones of the catalyst. Installation of such baffles has given a significant improvement in the ability of the catalyst to chemically reduce the nitrogen oxides content of the exhaust gas.

The exhaust gas continues through catalyst chamber 78 and enters outlet plenum 79. Air is injected into outlet plenum 79 through the series of openings in transverse air injection conduits 100 and 101. As the air mixes with the exhaust gas, oxidation spontaneously initiates and the oxidizing mixture passes through opening 85 in the same manner as described for the FIGS. 8 and 9 embodiment.

As mentioned earlier, the reactor is preferably connected directly to the exhaust ports of the internal combustion engine. This assures a minimum of heat loss from the exhaust gas and causes the unit to commence its function at the earliest time. Sometimes it is not possible to connect the unit directly to the engine because, in the case of an in-line engine, such connection might interfere with the space needed for the inlet manifold, or, in the case of either an in-line or V-type engine, there may not be sufficient space within the engine compartment to accommodate the unit extending out from the engine. In this event, the reactor can be connected to the engine through a short insulated conduit. This allows the installation of the unit below the inlet manifold in an in-line engine and underneath each bank of cylinders in a V-type engine.

Figure 12:
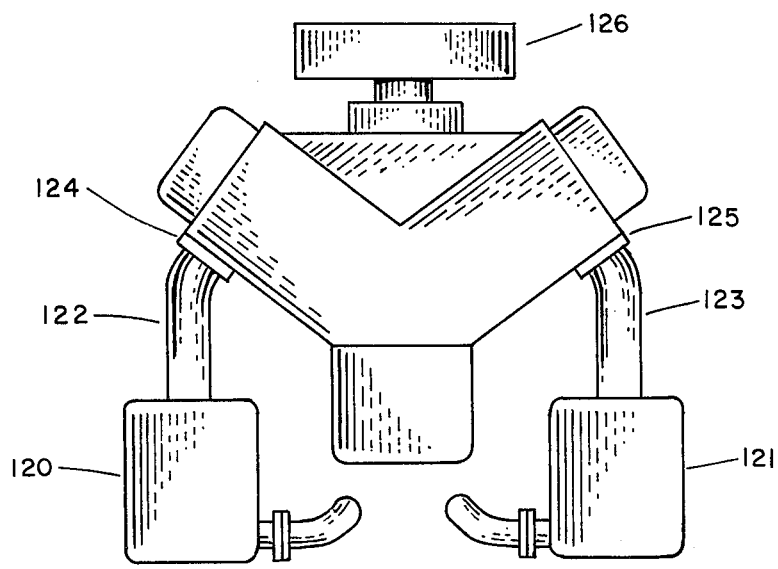
FIG. 12 is a front view of dual units installed on a V-type engine using short insulated conduits.
Figure 13:
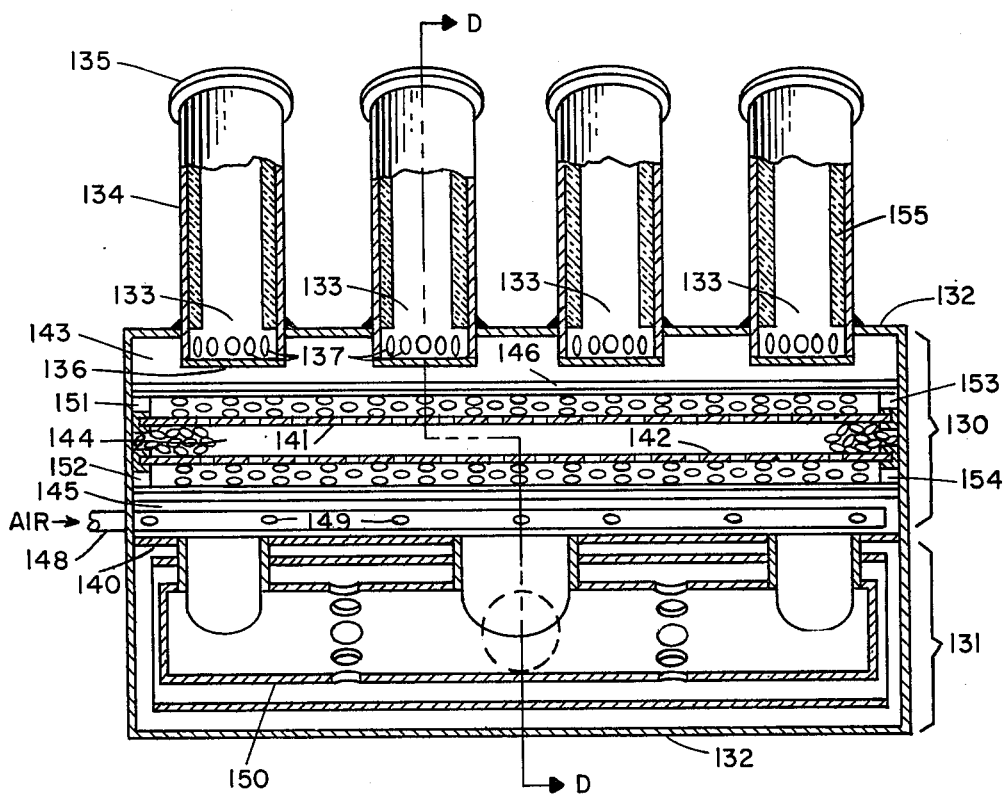
FIG. 13 is a longitudinal cross-section of one of the dual units of FIG. 12.
Figure 14:
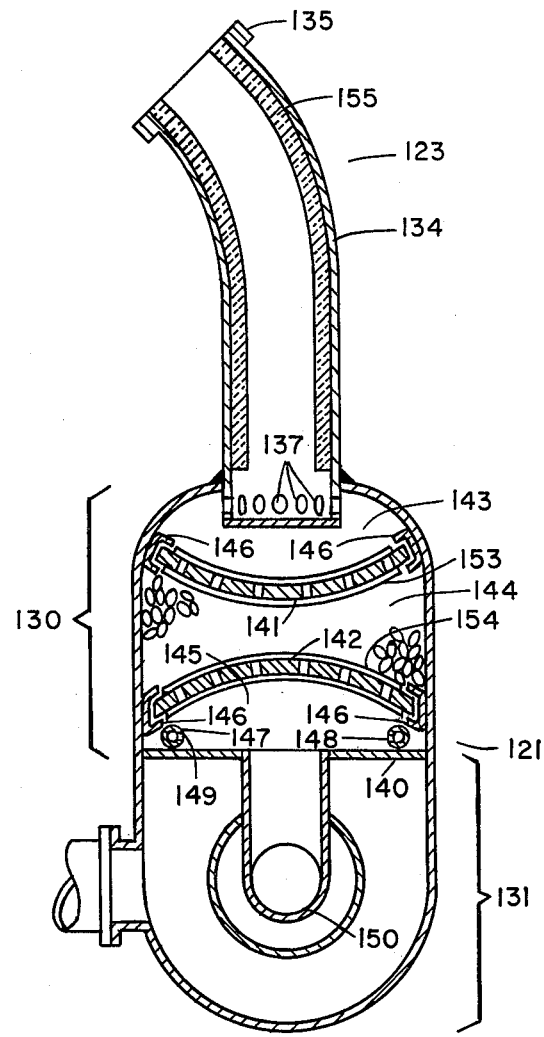
FIG. 14 is a transverse cross-section of the FIG. 13 embodiment taken at D—D.

This embodiment of the invention is shown in FIGS. 12, 13 and 14. Two-stage catalytic reactors 120 and 121 are connected by insulated conduits 122 and 123 to the exhaust ports 124 and 125 of internal combustion engine 126. The actual exhaust reactor is constructed similar to the previous embodiments. It comprises a catalytic reactor compartment 130 and a thermal reactor compartment 131. It is constructed of an elongated reactor housing 132 having exhaust inlets 133. Exhaust conduit 134 adapted to conduct exhaust gas from the engine exhaust port to the exhaust reactor have a flange 135 at one end adapted to bolt to the engine and a baffle plate 136 at the end extending through inlet 133. Openings 137 are provided around the circumference of conduit 134 immediately above baffle 136 and within inlet plenum 143. The inner surface of conduit 134 is insulated by refractory liner 155 to minimize heat loss from the exhaust gas.

Located within housing 132 is partition member 140 dividing the space within housing 132 into catalytic reactor compartment 130 and thermal reactor compartment 131. Catalytic reactor compartment 130 contains longitudinally positioned, spaced perforate catalyst retainers 141 and 142 dividing the space within compartment 130 into inlet plenum 143, catalyst chamber 144 and outlet plenum 145. Catalyst retainers 141 and 142 are curved inwardly in a transverse plane toward each other. This serves to prevent buckling of the retainers during operation. The straight longitudinal edges of retainers 141 are slidably fitted into the U-shaped groove in channel members 146 attached to the inside surface of housing 132 within catalyst compartment 130. The curved edges of retainers 141 and 142 are slidably fit into the U-shaped slot in curved channel members 151, 152, 153 and 154 attached to the end closures of housing 132. In this manner, the entire outer edge of retainers 141 and 142 is supported in a channel member.

Air injection conduits 147 and 148 extend longitudinally through outlet plenum 145 and have a series of openings 149 along their side wall.

Outlet plenum 145 is connected to the central housing 150 in thermal reactor compartment 131 in the same manner as described in the FIG. 3 embodiment.

In operation, exhaust gas leaving the engine exhaust port enters conduit 134 and is conducted through openings 137 into inlet plenum 143. It then passes through first perforate retainer 141 and contacts the catalyst in the catalyst chamber. It then leaves the catalyst chamber through perforate retainer 142 entering outlet plenum 145 wherein it is mixed with air injected through air injection conduits 148 and 149. Oxidation initiates spontaneously and the oxidizing mixture is conducted into central housing 150 of thermal reactor compartment 131 in the same manner as the FIG. 6 embodiment.

Figure 15:
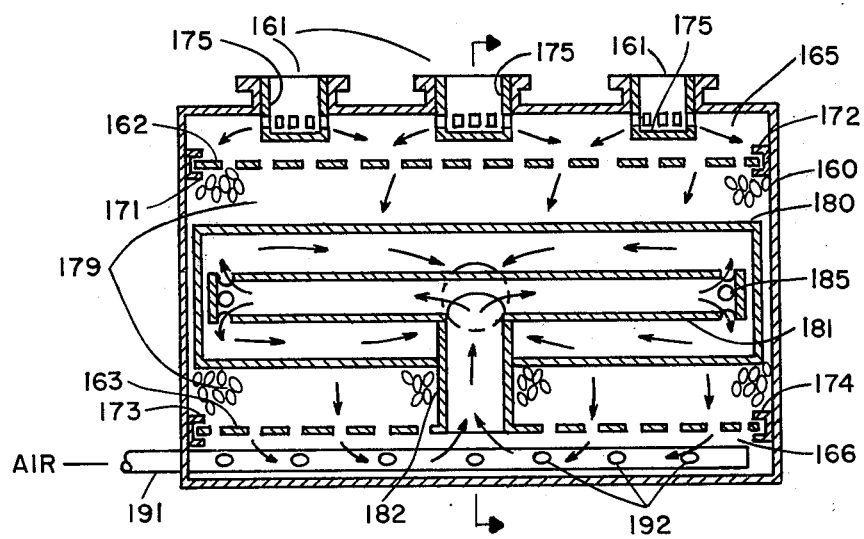
FIG. 15 is a longitudinal cross-section of an embodiment in which the thermal reactor is within the catalyst chamber.
Figure 16:
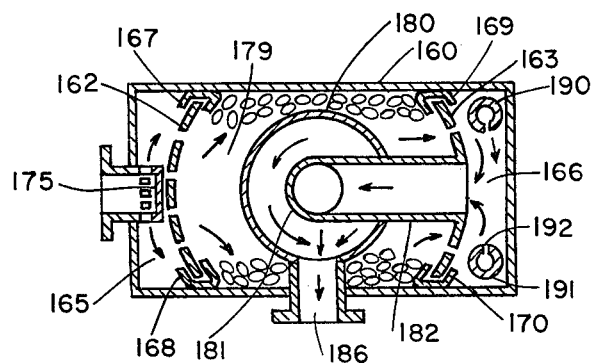
FIG. 16 is a transverse cross-section of the FIG. 15 embodiment.

FIGS. 15 and 16 show an embodiment in which the thermal reactor is positioned within the catalyst bed. It comprises reactor housing 160 having exhaust inlets 161 located along one longitudinal side wall and adapted to connect directly to the exhaust outlet of an internal combustion engine. Baffle members 175 are fit into each exhaust inlet. Longitudinal perforate retainers 162 and 163 are in spaced relationship and divide housing 160 into inlet plenum 165, catalyst chamber 179 and outlet plenum 166. Retainers 162 and 163 are curved outwardly on a transverse plane to provide stiffness. The longitudinal straight edges of retainers 162 and 163 are slidably fit into the U-shaped slot of channel members 167, 168, 169 and 170 which are attached longitudinally to the side wall of housing 160. The curved ends of retainers 162 and 163 are slidably fit into curved channel members 171, 172, 173 and 174 attached to the end closure of housing 160.

Located within catalyst chamber 179 is longitudinal cylindrical housing 180 closed at both ends. Located within housing 180 is central cylindrical housing 181, the interior of which is in fluid communication with outlet plenum 166 through conduit 182. Openings 185 are provided in central housing 181 proximate to its closed ends.

Housing 180 has an outlet 186 extending through housing 160 and adapted to connect to a standard exhaust system with or without a conventional muffler.

Located longitudinally inside outlet plenum 166 are air injection tubes 190 and 191 having a series of orifices 192 adapted to inject air substantially uniformly throughout outlet plenum 166.

In operation, exhaust gas enters inlet plenum 165 through inlet 161. It then passes through perforate retainer 162 and contacts the catalyst in chamber 179. It leaves the catalyst bed through retainer 163, entering outlet plenum 166. Air is injected into the hot exhaust gas through orifices 192 in an amount sufficient to render the exhaust gas oxidizing but not enough to cool the exhaust gas below auto ignition temperature. Oxidation initiates spontaneously and the exhaust gas/air mixture is conducted through conduit 182 to central housing 181. It then passes into cylindrical housing 180 and finally exits through outlet 186.

Figure 17:
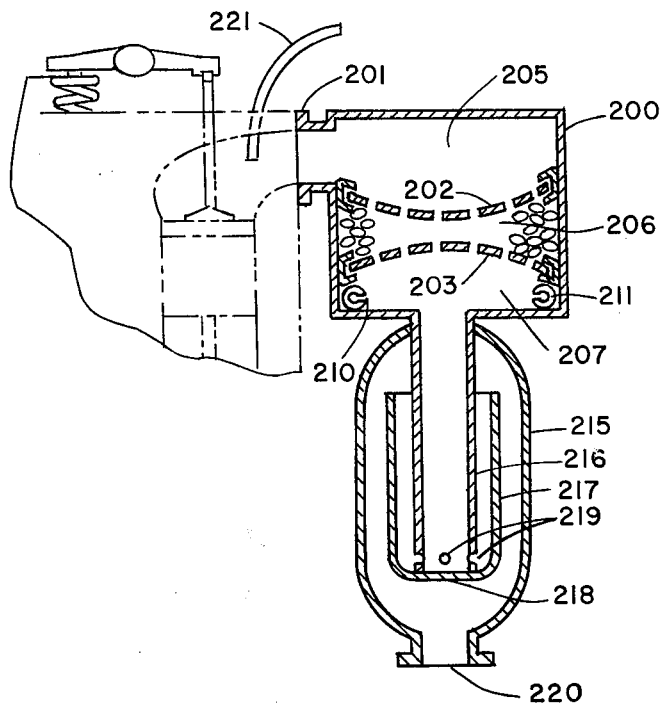
FIG. 17 shows a transverse cross-section of a catalytic reactor connected directly to an engine and a longitudinal section of a thermal reactor on a different axis.

Although the preferred units have the catalytic reactor and thermal reactor placed in longitudinal juxtaposition, this is not necessary as long as they are in close proximity. FIG. 17 shows a cross-section of a unit in which the thermal reactor is located beneath the catalytic reactor and on a different axis. It comprises catalytic reactor housing 200 adapted to connect directly to the exhaust outlet of an internal combustion engine by flanged exhaust inlet 201. Curved catalyst retainers 202 and 203 divide the space within housing 200 into inlet plenum 205, catalyst chamber 206 and outlet plenum 207. Longitudinal air injection conduits 210 and 211 are located within outlet plenum 207. Located on an axis perpendicular to housing 200 is cylindrical thermal reactor housing 215. Conduit 216 extends from outlet plenum 207 axially into housing 215. Cylindrical baffle 217 surrounds conduit 216 and has an end closure 218 at one end which also closes the bottom of conduit 216. Openings 219 provided in conduit 217 proximate to its closed end. Outlet 220 is provided in housing 215 adapted to connect to a standard exhaust system.

In operation, exhaust gas from the exhaust port of an engine containing sufficient carbon monoxide to reduce the nitrogen oxides present enters inlet 201. During the first few minutes of operation air is injected at the exhaust port through air injector 221 to render the exhaust oxidizing. During this short period the catalyst functions to catalyze oxidation of the exhaust hydrocarbon and carbon monoxide, giving rapid warm-up. Air injection through tube 221 is then stopped.

The exhaust gas enters catalyst chamber 206 through perforate retainer 202 and contacts the catalyst bed therein whereby nitrogen oxides are chemically reduced. The exhaust gas then enters outlet plenum 217 through retainer 203. Air is injected into the exhaust gas through the orifices in injection conduits 210 and 211. The exhaust gas/air mixture leaves outlet plenum 207 through conduit 216. On encountering the closed end of conduit 216 the exhaust gas mixture passes through openings 219 entering the annular space inside cylindrical baffle 217. It then passes out the open end of baffle 217 and finally leaves housing 215 through outlet 220.

As mentioned previously, tests have been carried out to demonstrate the improved results due to the air injection conduit extending through the outlet plenum compared to air injection in the individual conduits between the outlet plenum and the central housing in the thermal reactor. These tests were "hot start" Constant Volume Sampling (CVS) tests made following the 1972 Environmental Protection Agency procedure (Federal Register, July 2, 1971, Volume 36, No. 126). By hot start is meant that the test was started on a "hot" engine instead of a "cool" engine as specified in the CVS procedure. The tests were conducted using a 1972 Ford Pinto equipped with a manual transmission. The fuel used was a commercial gasoline containing 2 grams per gallon of lead as a commercial tetraethyllead antiknock compound. The exhaust reactor was constructed as in FIGS. 4 and 5. In the first test, air was injected by an individual tube extending into each of conduits 21. In the second test, air was injected by two three-eighths inch diameter tubes extending through outlet plenum 10. Each of the tubes was closed at its far end and had eight equally-spaced holes 1.5 mm diameter along its surface through which air was injected. The following table shows the results of these tests in terms of grams per mile of hydrocarbon, carbon monoxide and nitrogen oxide in the exhaust gas.

| Test No. | Hydrocarbons | Carbon Monoxide | Nitrogen Oxides |
|---|---|---|---|
| 1 | 0.36 | 11.70 | 0.58 |
| 2 | 0.12 | 6.09 | 0.61 |

As the above results show, the improved air injection system resulted in only one-third as much hydrocarbon and about one-half as much carbon monoxide in the exhaust gas.

Further tests were carried out which demonstrate that the two-stage reactor of this invention can reduce exhaust emissions well below the 1975 and 1976 limits set by the Environmental Protection Agency. These tests are the official EPA tests as described in Federal Register, July 2, 1971, Volume 36, No. 128, page 12657, sometimes referred to as the "Three Bag Test". They are conducted from a cold start and employ an intermediate shut-down period and subsequent hot start. The results of these tests are shown in the following table.

| | Proposed 1976 Maximum (g/mile) | Results* Obtained (g/mile) |
|---|---|---|
| Hydrocarbon | 0.41 | 0.27 |
| Carbon Monoxide | 3.40 | 3.06 |
| Nitrogen Oxides | 0.40 | 0.26 |

*Average of 3 tests, all of which were below the 1976 limits.

As the above table shows, the results obtained are substantially below the limits proposed by the EPA, especially with regard to hydrocarbon and nitrogen oxides.

I claim:

1. A unitary exhaust conditioning apparatus adapted to connect directly to an internal combustion engine and to lower the nitrogen oxide, hydrocarbon and carbon monoxide content of exhaust gas from said internal combustion engine, said apparatus comprising a catalytic reactor and a non-catalytic thermal reactor, said catalytic reactor comprising an elongated catalytic reactor housing formed by a side wall and end closures and having at least one exhaust inlet in said side wall adapted to connect directly to the exhaust ports of said internal combustion engine, an exhaust passage from said catalytic reactor to said thermal reactor, a longitudinal catalyst bed, longitudinally positioned perforate catalyst retainer members in spaced relationship forming a catalyst chamber in the space between said retainer members adapted to hold said catalyst bed, the edges of said retainer members being slidably fit into the U-slot of channel members attached to said side wall and end closures whereby substantially all of said exhaust gas passes through said catalyst bed in moving from said at least one exhaust inlet to said exhaust passage, said thermal reactor comprising an elongated thermal reactor housing positioned substantially parallel and immediately adjacent to said catalytic reactor such that said catalytic reactor and said thermal reactor form a two compartment engine manifold, said thermal reactor being further characterized in being without means for injecting supplemental fuel or supplemental ignition means, means for injecting air into said exhaust gas between said catalyst bed and said thermal reactor and an exhaust gas outlet in said thermal reactor housing.

2. An exhaust reactor of claim 1, Wherein said retainer members are curved in a transverse plane, the straight edges of said curved retainer members being slidably fit into the U-slot of longitudinal channel members attached to said side wall and the curved edges of said curved retainer members being slidably fit into the U-slot of curved channel members attached to said end closures.

3. An exhaust reactor of claim 2 wherein said curved retainer members are curved inwardly toward each other.

4. A unitary exhaust conditioning apparatus adapted to connect directly to an internal combustion engine and to lower the nitrogen oxide, hydrocarbon and carbon monoxide content of exhaust gas from said internal combustion engine, said apparatus comprising a catalytic reactor and a non-catalytic thermal reactor, said catalytic reactor comprising an elongated catalytic reactor housing formed by a side wall and end closures having at least one exhaust inlet in said side wall adapted to connect directly to the exhaust ports of said internal combustion engine, a longitudinal catalyst bed, said catalytic reactor housing having longitudinally positioned perforate catalyst retainer members in spaced relationship dividing the space within said catalytic reactor housing into A. an inlet plenum between said at least one exhaust inlet and the first of said retainers, B. a catalyst chamber for said catalyst bed between said retainers, and C. an outlet plenum between the second of said retainers and the portion of said side wall opposite said at least one exhaust inlet, said retainer members being inwardly curved toward each other in a transverse plane, the straight edges of said retainer members being slidably fit into the U-slot of longitudinal channel members attached to said side wall and the curved edges of said retainer members being slidably fit into the U-slot of curved channel members attached to said end closures, said thermal reactor comprising an elongated thermal reactor housing positioned substantially parallel and immediately adjacent to said catalytic reactor in fluid communication through at least one passage with said outlet plenum, such that said catalytic reactor and said thermal reactor form a two compartment engine manifold, said thermal reactor having a longitudinal central housing formed by a side wall and end closure at both ends, said central housing side wall having at least one opening which connects by a short conduit to said outlet plenum in said catalytic reactor housing, said short conduit being adapted to conduct an exhaust gas/air mixture from said outlet plenum into said central housing, said side wall thereof having at least one opening adapted to allow exhaust gas to escape from said central housing, and a baffle within said housing and surrounding said central housing, said baffle being open at both ends, said thermal reactor being further characterized in being without means for injecting supplemental fuel or supplemental ignition means, means for injecting air into said exhaust gas between said catalyst bed and said thermal reactor and an exhaust gas outlet in said thermal reactor housing.

5. A unitary exhaust conditioning apparatus adapted to connect directly to an internal combustion engine and to lower the nitrogen oxide, hydrocarbon and carbon monoxide content of exhaust gas from said internal combustion engine, said apparatus comprising a catalytic reactor and a non-catalytic thermal reactor, said catalytic reactor comprising an elongated catalytic reactor housing formed by a side wall and end closures and having at least one exhaust inlet in said side wall adapted to connect directly to the exhaust ports of said internal combustion engine, a longitudinal catalyst bed, said catalytic reactor housing having longitudinally positioned perforate catalyst retainer members in spaced relationship dividing the space within said catalytic reactor housing into A. an inlet plenum between said at least one exhaust inlet and the first of said retainers, B. a catalyst chamber for said catalyst bed between said retainers, and C. an outlet plenum between the second of said retainers and the portion of said side wall opposite said at least one exhaust inlet, said thermal reactor comprising an elongated thermal reactor housing positioned substantially parallel and immediately adjacent to said catalytic reactor and in fluid communication through at least one passage with said outlet plenum, such that said catalytic reactor and said thermal reactor form a two compartment engine manifold, said thermal reactor being further characterized in being without means for injecting supplemental fuel or supplemental ignition means, and at least one air injection conduit extending longitudinally through said outlet plenum, said conduit having a plurality of orifices in its wall adapted to inject air substantially uniformly throughout said outlet plenum, and an exhaust gas outlet in said thermal reactor housing.

6. An exhaust reactor of claim 5 having two substantially parallel air injection conduits extending longitudinally through said outlet plenum, each of said injection conduits being proximate to opposite side walls of said catalytic reactor housing.

7. An exhaust reactor of claim 6 wherein said thermal reactor housing contains a longitudinal central housing formed by a side wall and end closures at both ends, said central housing side wall having at least one opening which connects by a short conduit to said outlet plenum of said catalytic reactor housing, said short conduit being adapted to conduct an exhaust gas/air mixture from said outlet plenum into said central housing, said central housing side wall having at least one opening adapted to allow exhaust gas to escape said central housing, a baffle within said thermal reactor housing and surrounding said central housing, said baffle being open at both ends.

8. An exhaust reactor of claim 7 wherein the edges of said retainer members are slidably fit into the U-slot in channel members attached to said side wall and end closures.

9. An exhaust reactor of claim 8 wherein said retainer members are curved in a transverse plane, the straight edges of said retainer members being slidably fit into the U-slot of longitudinal channel members attached to said side wall of said catalytic reactor housing and the curved ends of said retainer members being slidably fit into curved channel members attached to said end closures.

10. An exhaust reactor of claim 9 wherein said retainer members are curved inwardly toward each other.

11. A unitary exhaust conditioning apparatus adapted to connect directly to an internal combustion engine and to lower the nitrogen oxide, hydrocarbon and carbon monoxide content of exhaust gas from said internal combustion engine, said apparatus comprising a catalytic reactor and a non-catalytic thermal reactor with a partition member therebetween, said catalytic reactor comprising an elongated catalytic reactor housing formed by a side wall and end closures and having at least one exhaust inlet in said side wall adapted to connect directly to an exhaust port of said internal combustion engine such that said catalytic reactor is proximate to said engine whereby exhaust gas entering said exhaust inlet is not substantially cooler than the temperature of said exhaust gas leaving said exhaust port, at least one opening in said partition to form an exhaust passage from said catalytic reactor to said thermal reactor, a longitudinal catalyst bed, said catalytic reactor containing perforate catalyst retainer members in spaced relationship dividing the space within said catalytic reactor into
 A. an inlet plenum between said at least one exhaust inlet and the first of said retainers,
 B. a catalyst chamber for said catalyst bed between said retainers, and
 C. an outlet plenum between the second of said retainers and said partition member,
substantially all of said exhaust gas passing through said catalyst bed in moving from said exhaust inlets to said exhaust passage, said thermal reactor comprising an elongated thermal reactor housing positioned substantially parallel and immediately adjacent to said catalytic reactor such that said catalytic reactor and said thermal reactor form a two compartment engine manifold, said thermal reactor being further characterized in being without means for injecting supplemental fuel or supplemental ignition means, means for injecting air into said outlet plenum and an exhaust gas outlet in said thermal reactor housing.

12. An exhaust reactor of claim 11 wherein the edges of said retainer members are slidably fit into the U-slot of channel members attached to the inner surface of said reactor housing inside said catalytic reactor compartment.

13. An exhaust reactor of claim 12 wherein said retainer members are curved in a transverse plane.

14. An exhaust reactor of claim 13 wherein said retainer members are curved in a transverse plane inwardly toward each other, the straight edges of said retainer members being slidably fit into the U-slot of longitudinal channel members attached to said side wall within said catalytic reactor compartment and the curved ends of said retainer members being slidably fit into the U-slot of curved channel members attached to the end wall within said catalytic reactor chamber.

15. An exhaust reactor of claim 14 wherein said inlet is adapted to connect to said exhaust port of said engine through a short conduit, said conduit being insulated to minimize heat loss of said exhaust gas in passing from said exhaust port to said catalytic reactor housing.

16. An exhaust reactor of claim 11 wherein said air injection means comprises at least one air injection conduit extending longitudinally through said outlet plenum, said air injection conduit having a plurality of orifices in its wall adapted to inject air substantially uniformly throughout said outlet plenum.

17. An exhaust reactor of claim 16 wherein said thermal reactor compartment contains a longitudinal central housing formed by a side wall and end closures at both ends, said central housing being in fluid communication with said outlet plenum through at least one short conduit connected with said opening in said partition member such that the exhaust gas/air mixture can pass directly from said outlet plenum into said central housing, said central housing having at least one opening in its side wall whereby exhaust gas can escape said central housing.

18. An exhaust reactor of claim 17 having a baffle within said thermal reactor compartment surrounding said central housing, said baffle being open at both ends.

19. An exhaust reactor of claim 11 wherein said thermal reactor compartment contains a longitudinal central housing formed by a side wall and end closures at both ends, said central housing being in fluid communication with said outlet plenum through a short conduit connected to said opening in said partition member such that the exhaust gas/air mixture can pass directly from said outlet plenum into said central housing, said central housing having at least one opening in its side wall proximate to each end and said central housing having bowl-shaped deflector members attached to each end, the open ends of said deflector members pointing toward each other.

20. An exhaust reactor of claim 19 wherein the edges of said retainer members are slidably fit into the U-slot of channel members attached to the side walls and end closures of said reactor housing within said catalytic reactor compartment.

21. An exhaust reactor of claim 20 wherein said retainer members are curved in a transverse plane, the straight edges of said retainer members being slidably fit into the U-slot of longitudinal channel members attached to said side wall and the curved edges of said retainer members being slidably fit into the U-slot of curved retainer members attached to said end closures.

22. An exhaust reactor of claim 21 wherein said retainer members are curved inwardly toward each other.

23. An exhaust reactor of claim 22 wherein said air injection means comprises at least one air injection conduit extending longitudinally through said outlet plenum, said injection conduit having a plurality of orifices in its wall adapted to inject air substantially uniformly throughout said outlet plenum.

24. An exhaust reactor of claim 22 wherein said air injection means comprises air injection tubes at both ends of said outlet plenum, each tube extending transversely into said outlet plenum.

25. An exhaust reactor of claim 24 wherein said air injection tubes have a plurality of openings in their side wall.

26. A unitary exhaust conditioning apparatus adapted to connect directly to an internal combustion engine and to lower the nitrogen oxide, hydrocarbon and carbon monoxide content of exhaust gas from said internal combustion engine, said apparatus comprising a catalytic reactor and a non-catalytic thermal reactor, said catalytic reactor comprising an elongated catalytic reactor housing formed by a side wall and end closures having at least one exhaust inlet in said side wall adapted to connect directly to the exhaust ports of said internal combustion engine, a longitudinal catalyst bed, said catalytic reactor housing having longitudinally positioned perforate catalyst retainer members is spaced relationship dividing the space within said catalytic reactor housing into A. an inlet plenum between said at least one exhaust inlet and the first of said retainers,
B. a catalyst chamber for said catalyst bed between said retainers, and
C. an outlet plenum between the second of said retainers and the portion of said side wall opposite said at least one exhaust inlet, said retainer members being inwardly curved toward each other in a transverse plane, the straight edges of said retainer members being slidably fit into the U-slot of longitudinal channel members attached to said side wall and the curved edges of said retainer members being slidably fit into the U-slot of curved channel members attached to said end closures, said thermal reactor comprising an elongated thermal reactor housing positioned substantially parallel and immediately adjacent to said catalytic reactor and in fluid communication through at least one passage with said outlet plenum, such that said catalytic reactor and said thermal reactor form a two compartment engine manifold, an exhaust baffle located within said inlet plenum at said at least one exhaust inlet, said baffle being spaced from said at least one exhaust inlet to enable exhaust gas to escape around its periphery, said thermal reactor being further characterized in being without means for injecting supplemental fuel or supplemental ignition means, means for injecting air into said outlet plenum and an exhaust gas outlet in said thermal reactor housing.

27. An exhaust reactor of claim 10 including an exhaust baffle located within said inlet plenum at said exhaust inlet, said baffle being spaced from said exhaust inlet to enable exhaust gas to escape around its periphery.

28. An exhaust reactor of claim 22 including an exhaust baffle located within said inlet plenum at said exhaust inlet, said baffle being spaced from said exhaust inlet to enable exhaust gas to escape around its periphery.

29. An exhaust reactor of claim 23 including an exhaust baffle located within said inlet plenum at said exhaust inlet, said baffle being spaced from said exhaust inlet to enable exhaust gas to escape around its periphery.

30. An exhaust reactor of claim 29 wherein said catalyst chamber contains an exhaust gas catalyst, said catalyst consisting of a mixture of 10–90 weight percent of (a) a catalyst consisting essentially of 5–10 weight percent copper oxide and 5–10 weight percent vanadia on a silica-alumina support, said silica-alumina consisting essentially of 70–90 weight percent silica and 10–30 weight percent alumina and 10–90 weight percent of (b) a catalyst consisting essentially of 5–10 weight percent copper oxide and 5–10 weight percent vanadia on an alumina support, said alumina containing 1–20 weight percent silica.

31. An exhaust reactor of claim 23 further characterized by including an exhaust by-pass conduit adapted to provide an exhaust flow path which circumvents said catalyst chamber, valve means in said by-pass conduit, valve actuating means adapted to open and close said valve means, and temperature sensing means within said catalyst chamber adapted to signal said valve actuating means to open said valve means when the temperature within said catalyst chamber is above a predetermined level and close said valve means when the temperature within said catalyst chamber is below said predetermined level.

32. A unitary exhaust conditioning apparatus adapted to connect directly to an internal combustion engine and to lower the nitrogen oxide, hydrocarbon and carbon monoxide content of exhaust gas from said internal combustion engine, said apparatus comprising a catalytic reactor and a non-catalytic thermal reactor, said catalytic reactor comprising an elongated catalytic reactor housing having exhaust inlets along one side adapted to connect directly to the exhaust ports of said internal combustion engine, an exhaust passage from said catalytic reactor to said thermal reactor, a longitudinal catalyst bed located within said catalytic reactor housing completely across said catalytic reactor housing such that substantially all of said exhaust gas passes through said catalyst bed in moving from said exhaust inlets to said exhaust passage, said thermal reactor comprising a longitudinally positioned cylindrical housing closed at both ends and positioned substantially parallel and immediately adjacent to said catalytic reactor such that said catalytic reactor and said thermal reactor form a two compartment engine manifold, said exhaust passage connecting with said cylindrical housing to form a flow path from said catalyst bed into said cylindrical housing, said cylindrical housing having openings communicating with the space within said thermal reactor housing, said thermal reactor being further characterized in being without means for injecting supplemental fuel or supplemental ignition means, means for injecting air into said exhaust gas between said catalyst bed and said thermal reactor and an exhaust gas outlet in said thermal reactor housing.

33. An exhaust conditioning apparatus adapted to lower the nitrogen oxide, hydrocarbon and carbon monoxide content of the exhaust gas from an internal combustion engine, said apparatus comprising a catalytic reactor formed by a catalytic reactor housing having an exhaust gas inlet and outlet and having disposed therein a catalyst bed such that said exhaust gas passes through said catalyst bed in passing from said inlet to said outlet, said exhaust gas inlet being adapted to connect directly to an exhaust gas outlet of a combustion chamber of said engine, a non-catalytic reactor formed by a non-catalytic reactor housing having an entry port and exit port and not having supplemental ignition means, a cylindrical housing closed at both ends located within said non-catalytic reactor housing, said outlet of said catalytic reactor housing consisting of outer tubes proximate to the ends of said catalytic reactor housing and a central tube proximate to the middle of said catalytic reactor housing, said outer tubes communicating from said outlet of said catalytic reactor housing into said cylindrical housing proximate to the closed ends of said cylindrical housing and said central tube communicating from said outlet of said catalytic reactor housing into said cylindrical housing proximate to the middle of said cylindrical housing, said cylindrical housing having openings communicating with the space within said non-catalytic reactor housing.

34. An exhaust conditioning apparatus adapted to lower the nitrogen oxide, hydrocarbon and carbon monoxide content of the exhaust gas from an internal combustion engine, said apparatus comprising a catalytic reactor formed by a catalytic reactor housing having an exhaust gas inlet and outlet and having disposed therein a catalyst bed such that said exhaust gas passes through said catalyst bed in passing from said inlet to said outlet, said exhaust gas inlet being adapted to connect directly to an exhaust gas outlet of a combustion chamber of said engine, a non-catalytic reactor formed by a non-catalytic reactor housing having an entry port and exit port and not having supplemental ignition means, a cylindrical housing closed at both ends located within said non-catalytic reactor housing, said outlet of said catalytic reactor housing consisting of outer tubes proximate to the ends of said catalytic reactor housing, said outer tubes communicating from said outlet of said catalytic reactor housing into said cylindrical housing proximate to the closed ends of said cylindrical housing and said central tube communicating from said outlet of said catalytic reactor housing into said cylindrical housing proximate to the middle of said cylindrical housing, each of said outer tubes having a diameter about 75 percent of the diameter of said central tube, said cylindrical housing having openings communicating with the space within said non-catalytic reactor housing.

35. A unitary exhaust conditioning apparatus adapted to connect directly to an internal combustion engine and to lower the nitrogen oxide, hydrocarbon and carbon monoxide content of exhaust gas from said internal combustion engine, said apparatus comprising a catalytic reactor and a non-catalytic thermal reactor, said catalytic reactor comprising an elongated catalytic reactor housing having exhaust inlets along one side adapted to connect directly to the exhaust ports of said internal combustion engine, an exhaust passage from said catalytic reactor to said thermal reactor, a longitudinal catalyst bed located within said catalytic reactor housing completely across said catalytic reactor housing such that substantially all of said exhaust gas passes through said catalyst bed in moving from said exhaust inlets to said exhaust passage, said thermal reactor comprising an elongated thermal reactor housing positioned substantially parallel and immediately adjacent to said catalytic reactor such that said catalytic reactor and said thermal reactor form a two compartment engine manifold, said thermal reactor being further characterized in being without means for injecting supplemental fuel or supplemental ignition means, means for injecting air into said exhaust gas between said catalyst bed and said thermal reactor, an exhaust outlet in said thermal reactor housing, said thermal reactor housing containing a longitudinally positioned cylindrical housing closed at both ends, said exhaust passage connecting said catalytic reactor to said cylindrical housing forming a flow path from said catalyst bed into said cylindrical housing, said cylindrical housing having openings communicating with the space within said thermal reactor housing and a longitudinal cylindrical baffle open at both ends positioned within said thermal reactor housing surrounding said cylindrical housing.

36. A unitary exhaust conditioning apparatus adapted to connect directly to an internal combustion engine and to lower the nitrogen oxide, hydrocarbon and carbon monoxide content of exhaust gas from said internal combustion engine, said apparatus comprising a catalytic reactor and a non-catalytic thermal reactor, said catalytic reactor comprising an elongated catalytic reactor housing having exhaust inlets along one side adapted to connect directly to the exhaust ports of said internal combustion engine, an exhaust passage from said catalytic reactor to said thermal reactor, a longitudinal catalyst bed located within said catalytic reactor housing completely across said catalytic reactor housing such that substantially all of said exhaust gas passes through said catalyst bed in moving from said exhaust inlets to said exhaust passage, said thermal reactor comprising an elongated thermal reactor housing positioned substantially parallel and immediately adjacent to said catalytic reactor such that said catalytic reactor and said thermal reactor form a two compartment engine manifold, said thermal reactor being further characterized in being without means for injecting supplemental fuel or supplemental ignition means, means for injecting air into said exhaust gas between said catalyst bed and said thermal reactor, an exhaust outlet in said thermal reactor housing, said thermal reactor housing containing a longitudinally positioned cylindrical housing closed at both ends, said exhaust passage connecting said catalytic reactor to said cylindrical housing forming a flow path from said catalyst bed into said cylindrical housing, said cylindrical housing having openings communicating with the space within said thermal reactor housing, said exhaust passage consisting of outer tubular conduits located proximate to the ends of said catalytic and said thermal reactor housings and a central tubular conduit located near the middle of said catalytic and said thermal reactor housings, each of said outer tubular conduits having a diameter about 75 percent of the diameter of said central tubular conduit.

* * * * *

UNITED STATES PATENT AND TRADEMARK OFFICE
CERTIFICATE OF CORRECTION

PATENT NO. : 3,911,676
DATED : October 14, 1975
INVENTOR(S) : Kund Jensen

It is certified that error appears in the above—identified patent and that said Letters Patent are hereby corrected as shown below:

Please add to the heading of the above identified patent the following:

(30) Foreign Application priority data.

October 19, 1970   Denmark   5308/70

Signed and Sealed this twenty-fourth Day of February 1976

[SEAL]

*Attest:*

RUTH C. MASON
*Attesting Officer*

C. MARSHALL DANN
*Commissioner of Patents and Trademarks*